LEVEL MARKING FOR TELEPHONE LINE FINDERS

Filed June 24, 1947 2 Sheets-Sheet 1

*INVENTOR.*
CHARLES F. FFOLLIOTT

*BY*

[signature]

ATTORNEY

May 15, 1951 C. F. FFOLLIOTT 2,552,773

LEVEL MARKING FOR TELEPHONE LINE FINDERS

Filed June 24, 1947 2 Sheets-Sheet 2

INVENTOR.
CHARLES F. FFOLLIOTT

BY

ATTORNEY

Patented May 15, 1951 2,552,773

UNITED STATES PATENT OFFICE 2,552,773

LEVEL MARKING FOR TELEPHONE LINE FINDERS

Charles F. Ffolliott, Elgin, Ill., assignor to Automatic Electric Laboratories, Inc., Chicago, Ill., a corporation of Delaware Application June 24, 1947, Serial No. 756,573

7 Claims. (Cl. 179—18)

The present invention relates in general to automatic telephone systems, and more particularly to systems in which linefinders connect a subscriber's calling line to a first numerical switch.

An object of the invention is to provide control circuits to allow efficient simultaneous operation of a plurality of finders employing standard Strowger switches.

One feature relates to level-marking cut-off relays which remove the marking potential from the vertical bank contacts.

Another feature of the invention permits only one line relay of one level or of associated levels to operate at one time.

Figures 1, 3:
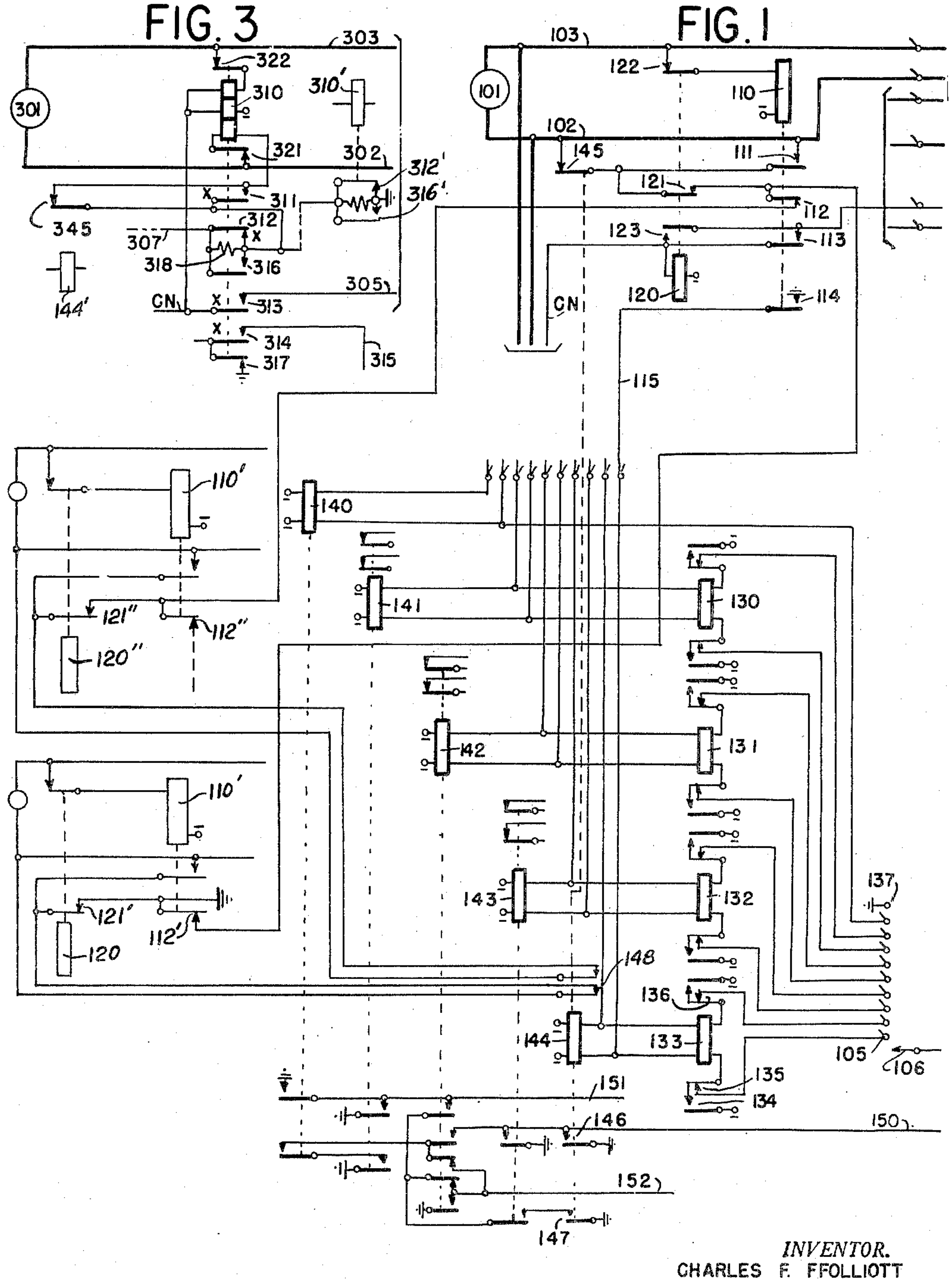
Figure 2:
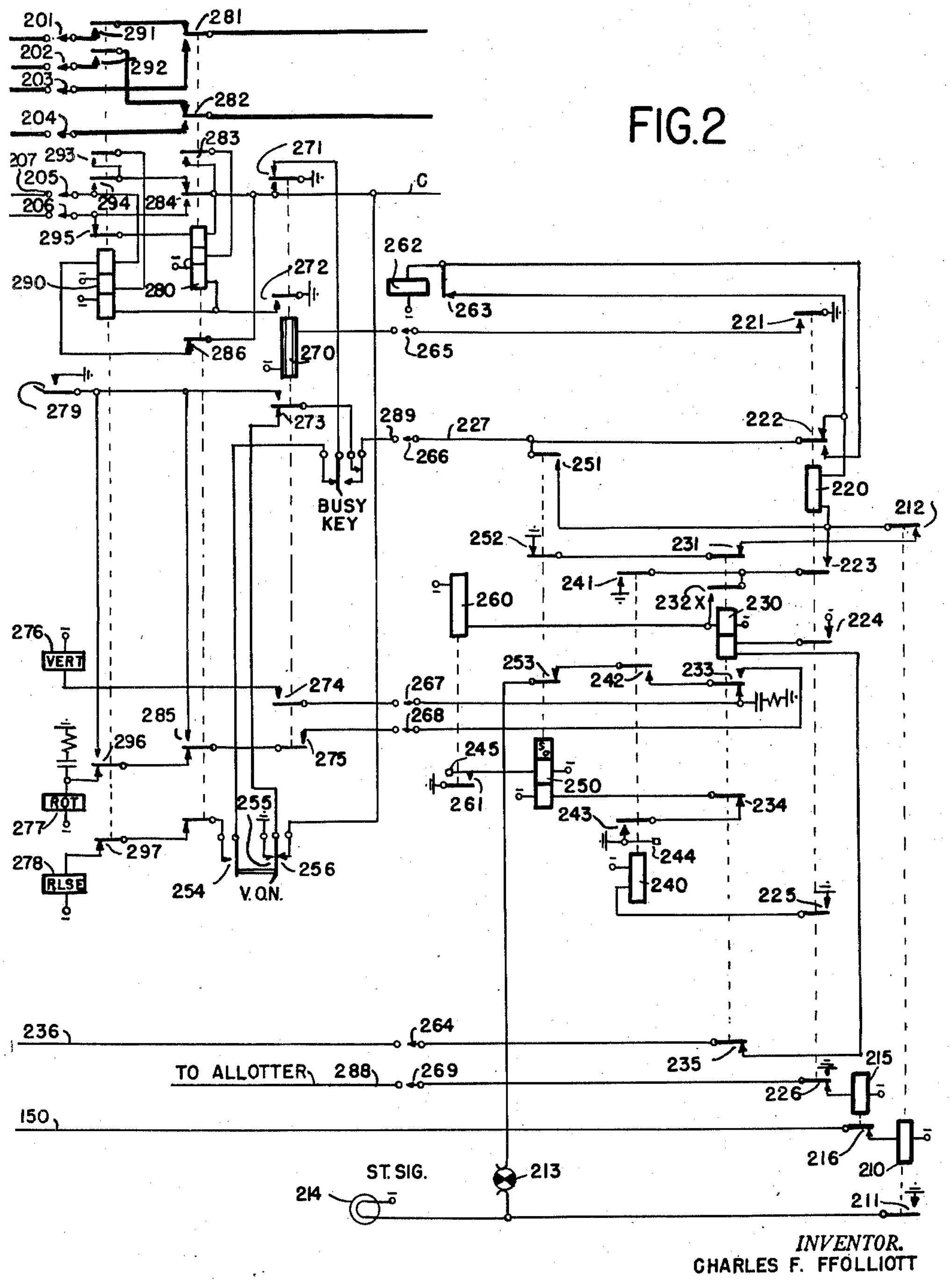

Figures 1 and 2 arranged together show subscribers' line equipment, finders, allotters, and associated start and control means. The line circuit of Figure 3 showing one 2-step relay may be substituted for that in Figure 1 showing separate line and cut-off relays.

In Figure 2, the 200-line finder at the left, and the allotter at the right are in general similar to those disclosed in Patent 1,851,132, issued March 29, 1932, to Norman H. Saunders. Formerly, the finders were divided into two groups and each group had one allotter; but in the present illustration all finders of a 200-line system are in one group and are equally accessible by three allotters. The finder switch includes wipers 201 to 206 inclusive, vertical stepping magnet 276, rotary stepping magnet 277, and release magnet 278. The distributor is a rotary switch with stepping magnet 262, and wipers 264 to 269, inclusive.

In Figure 1, the level start relays 140 to 144 correspond to relays SA, SB, SC, SD, and SE in Figure 1 of Patent 1,914,540, issued June 20, 1933, to R. Taylor et al. In the finder system disclosed by Taylor et al. and in the finder system of the present invention the 200-lines are divided into five groups, each group containing two levels of forty lines which are served by a single level start relay having separate winding for each level. In addition to the contacts for starting the allotters, each of the level start relays 141 to 144 inclusive of the present invention controls break contacts for the operating circuits of the line relays associated with the level start relay.

The levels are also associated according to their priority in starting allotters. During light calling traffic, any line relay of the lower four levels upon operating energizes either level start relay 143 or 144 to place ground on allotter start lead 150, any line relay of the fifth and sixth levels upon operating energizes level start relay 142 to place ground on allotter start 152, and any line of the upper four levels upon operating energizes either level start relay 140 or 141 to place ground on lead 151 which starts still a different allotter. However, when the calling traffic is heavy on the lower four levels and light on the other levels, both level start relays 143 and 144 are operated simultaneously to place ground on lead 150 and also on allotter start lead 152 which is generally associated with the fifth and sixth levels. Moreover, possible combinations of operated start relays due to simultaneous calls within the groups enable any line to start any allotter.

Break contacts of the line relays in a group are connected in series to form a chain circuit to ground. When subscribers whose lines are connected to one group of line relays initiate calls simultaneously, only one line relay operates immediately, because the operation of the line relay with a preferred position in the chain circuit removes ground potential from the line relays connected still further from ground.

The level marking cut-off relays 130 to 133 inclusive in Figure 1 permit efficient simultaneous operation of standard Strowger finder switches. The vertical bank contact for every level except the upper two is connected to the marking ground potential through a winding of a level marking cut-off relay.

To aid in the understanding of the novel features of the invention, a general description is now given.

The operation of a line relay 110 closes its locking circuit, completes a circuit to operate a level start relay 144, and through a winding of a level marking cut-off relay 133 places ground potential on a vertical bank contact. Upon operating, the level start relay opens the operating circuits of all the line relays of the group, and places ground on an allotter start lead. Assuming the allotter has preselected an idle finder, the wipers are stepped up to the marked vertical bank contact to complete a circuit from ground, contacts 114, level marking cut-off relay 133, vertical bank contact 105, vertical wiper 106, distributor wiper 264, contacts 235, lower winding of changeover relay 230, make contacts 224 to negative battery. The level marking cut-off relay operates, completes its locking circuit from ground at contacts 114 to negative battery at contacts 134, and opens the circuits to the vertical bank contacts of the two associated levels in which the calling line appears. Before ground is removed from the marked vertical bank contact, the changeover relay 230 operates to close its locking circuit to its upper winding.

While the level marking cut-off relay at the level is operated, the wipers of another finder may step on to a higher marked level.

This arrangement which opens the marking circuit is adapted to the standard Strowger switch, for the vertical wiper is free to move off the vertical bank contacts when rotary stepping begins.

Through its upper winding the changeover relay operates fully to transfer the pulsing circuit from the vertical stepping magnet 276 to the rotary stepping magnet 277. The wipers rotate until either the upper or lower test wiper encounters negative battery from the calling subscriber's cut-off relay. Assuming the calling line is in the upper 100-line bank, relay 290 operates to connect the calling line to a first numerical switch, and to return ground on the control lead. Cut-off relay 120 operates to disconnect line relay 110 from the negative line and to remove ground from the positive line.

Upon releasing, the line relay opens the circuit of the level start relay and the level marking cut-off relay simultaneously. Other line relays of the group cannot operate to close the circuit to the level marking cut-off relay until the level start relay releases. During the interval that the line relays are not operated, the level marking cut-off relay releases to open another point in its locking circuit and to prepare the level marking circuits for the succeeding call.

A detailed description is now given. When the subscriber 101 initiates a call, the circuit for line relay 110 is completed from ground, chain contacts 112', contacts 121 of cut-off relay 120, contacts 145 of level start relay 144, line 102, subscriber's telephone 101, line 103, contacts 122, winding of relay 110 to negative battery. The operation of relay 110 opens the chain at contacts 112 to prevent the operation of line relays that are in that part of the chain further from ground. At contacts 111 a circuit is closed in multiple with contacts 145; at contacts 113 negative potential is extended from cut-off relay 120 to mark contact 207 in the bank of the finder; at contacts 114 ground is applied through the level-marking cut-off relay 133 to mark vertical bank contact 105; and also at contacts 114 the circuit is completed to operate level start relay 144.

Relay 144 at contacts 145 and at other contacts such as contacts 148 opens the operating circuits of all line relays in the group, at contacts 146 closes the circuit of relay 210, and at contacts 147 prepares another allotter start circuit for calls that may originate in levels three and four. Relay 210 operates. At contacts 211, circuits of the pulse machine 213 and of the start signal 214 are completed; at contacts 212 the operating circuit of relay 220 is completed from ground, contacts 252, contacts 231, contacts 212, winding of relay 220, interrupter contact 263, winding of stepping magnet 262 to negative battery. Relay 220 at contacts 221 completes the circuit for the finder start relay 270, at armature 222 connects the guard lead 227 to the winding of the stepping magnet 262, at contacts 223 prepares its locking circuit, at contacts 224 prepares a circuit for changeover relay 230, at contacts 225 closes the circuit of relay 240, and at contacts 226 prepares a circuit for a relay corresponding to relay 215. When relay 240 operates, the armature closes the make contacts 241 and 242 and also strikes the weighted spring 244 to start it vibrating. Relay 240 at contacts 241 places a multiple ground on the winding of relay 220, at contacts 242 prepares the pulsing circuit for the stepping magnets of the finder, and at contacts 243 closes the intermittent circuit including contacts 234 and the lower winding of the slow-operating relay 250.

Finder start relay 270 operates. At armature 271 ground is removed from the lead to the release magnet and is placed on control lead C; at contacts 272 the biasing circuits of relays 280 and 290 are completed; at armature 273 the guard lead is transferred from the vertical off-normal springs VON to cam springs 279; at contacts 274 the pulsing circuit is completed for the vertical stepping magnet; and at contacts 275 the pulsing circuit is prepared for the rotary stepping magnet. The operating circuit of the vertical magnet may be traced from the pulsing machine 213, contacts 253, contacts 242, armature 233, wiper 267, contacts 274, vertical magnet 276 to the negative battery.

Responsive to the first step the vertical off-normal springs VON are operated; at contacts 254 the circuit for the release magnet is prepared; and at contacts 255 a circuit to ground is prepared for guarding purposes. When the vertical wiper encounters the marked contact—for example, contact 105 marking the first level—the circuit to energize relays 230 and 133 in series is closed from ground, contacts 114, lower winding of relay 133, vertical contact 105, vertical wiper 106, wiper 264, contacts 235, lower winding of changeover relay 230, contacts 224, to negative battery. Relay 230 operates sufficiently to close contacts 232 which complete the circuit from ground, contacts 241, contacts 232, upper winding of relay 230 to negative battery. Relay 133 operates, at contacts 134 closes its locking circuit and at contacts 135 removes the marking potential from the vertical bank contact 105, changeover relay 230 operates fully through its upper winding. At contacts 231 the initial operating ground is disconnected from relay 220; at armature 233 the pulsing circuit is transferred from the vertical stepping magnet to the rotary stepping magnet; and at contacts 235 the test lead 236 is disconnected from the lower winding of relay 230.

Normally the circuit including the lower winding of trouble relay 250 is opened at contacts 234 before the vibrating spring 244 closes the circuit for intervals sufficiently long to operate relay 250. During the remaining time that the allotter is at this finder, the upper winding of relay 250 is closed intermittently by vibrating spring 245 and contacts 261. These contacts are actuated by relay 260 which is energized over an obvious circuit when relay 230 is operated.

The operating circuit for the rotary stepping magnet includes the pulse machine 213, contacts 253, contacts 242, make contacts at armature 233, wiper 268, contacts 275, contacts 285, rotary magnet 277, and negative battery. When the rotary wiper 205 finds the marked contact 207, switching relay 290 operates to open the circuit of the rotary stepping magnet. The circuit to operate relay 290 is completed from ground, make contacts 271, contacts 286, upper winding of relay 290, wipers 205, bank contact 207, contacts 113, cut-off relay 120 to negative battery. Relay 290 at contacts 291 and 292 switches the calling line through to the first numerical switch, at contacts 293 completes its locking circuit to control lead C, at contacts 294 extends ground from the control lead to lead CN, at contacts 295 opens the operating circuit to relay 280, at armature 296 transfers the ground pulses from the rotary stepping magnet to the guard lead, and at contacts 297 opens a point in the incomplete circuit of the release magnet. The first numerical switch returns dial tone to the subscriber's line, and places a holding ground on the control lead C.

When the switching relay places ground on lead CN, cut-off relay 120 operates, at contacts 122 disconnects line relay 110, at contacts 121 removes ground from the line, and at contacts 123 closes its locking circuit. Upon releasing relay 110 at contacts 111 opens a further point in its locking circuit, at contacts 112 prepares the operating circuit for the line relays further along in the chain, at contacts 113 opens one of the multiple circuits in the control lead, and at contacts 114 removes the ground potential from lead 115 to release relays 144 and 133.

After the release of relay 110, the operating circuits of all line relays associated with the two lower levels remain open momentarily at the break contacts of relay 144. This interval during which ground cannot be placed on lead 115 is provided to insure the release of relay 133.

Upon releasing, relay 133 prepares the marking circuits to the lower two levels at contacts 135 and 136, and opens a further point in its locking circuit at contacts 134. Relay 144 releases, at contacts 145 and 148 prepares the operating circuits of all line relays in the group, at contacts 146 opens the circuit to relay 210, and at contacts 147 opens the start circuit that was prepared for a call in levels three and four. Relay 210 may release, or during heavy calling traffic it could remain energized by the operation of other level start relays.

Since the finder is a 200-point finder, and, therefore, has two sets of wipers it may so happen that test wiper 206 instead of test wiper 205 may encounter the negative battery calling potential of the calling line. In this case, the finder is operated in the same manner as previously described and when wiper 206 encounters the negative battery calling potential on the test contact associated with the calling line, a circuit will be completed for operating the switching relay 280 as follows: ground, make contacts 271, upper winding of switching relay 280, contacts 295, and negative potential at wiper 206. Upon energizing, relay 280 at armatures 281 and 282 connects the lower set of wipers for use, at contacts 283 closes its locking circuit, at armature 284 connects the grounded release trunk conductor to the test contact of the calling line for guarding purposes, and at armature 285 opens the circuit of the rotary magnet and also places ground upon guard lead 227 to step the allotter to the next finder.

In case the test wipers 205 and 206 should simultaneously encounter calling potentials both switching relays operate, but switching relay 290 will be ineffective because the switching relay 280 disconnects the upper set of wipers, and opens the locking circuit of relay 290.

In case either of the test wipers 205 or 206 should encounter booster battery metering potential during their rotation before the calling line is reached, the booster battery would close a circuit through the upper winding of the switching relay but this circuit would be in opposition to the circuit through the polarizing winding with the result that the switching relay would not be operated.

Returning to the allotter at the time switching relay 290 operates to transfer ground pulses to guard lead 227. The circuit to energize stepping magnet 262 and to short circuit the winding of relay 220 extends from the pulse machine 213 to contacts 253, contacts 242, make contacts 233, wiper 268, contacts 275, break contacts 285, make contacts 296, make contacts 273, busy key, wiper 266, make contacts 222, to the stepping magnet 262, and also through interrupter springs 263 to relay 220. The magnet 262 withdraws the pawl of the switch from the ratchet wheel and operates interrupter springs 263 opening the circuit to relay 220.

Upon releasing relay 220 at contacts 221 opens the circuit of slow-acting relay 270, at armature 222 opens the energizing circuit of magnet 262 by transferring the guard lead to the interrupter springs 263, at contacts 223 opens the ground circuit of relay 220, at contacts 224 opens a further point in the vertical test circuit, at contacts 225 opens the circuit of relay 240, and at contacts 226 prepares the circuit for relay 215. Stepping magnet 262 deenergizes to advance wipers 264 to 269 inclusive to the contacts associated with another finder. Relay 240 releases, at contacts 243 opens a further point in the circuit to the lower winding of relay 250, at contacts 242 opens the ground pulse circuit, and at contacts 241 opens the circuit of relays 230 and 260. Upon releasing relay 230 at contacts 231 prepares the operating circuit of relay 220, at contacts 232 opens its locking circuit, at armature 233 transfers the incomplete pulse circuit to the vertical magnet, and at contacts 234 prepares a circuit to relay 250. Relay 260 releases to open the intermittent circuit to slow-acting relay 250 which has not operated. Relay 270 releases. At armature 271 ground is transferred from the control lead C, which is now maintained at ground potential by the holding relay of the first numerical switch, to the incomplete circuit of the release magnet. At contacts 273, ground at the vertical off-normal springs VON is placed on a contact of the rotary switch bank for guarding purposes; at contacts 273 the circuits of the polarizing windings of relays 280 and 290 are opened; and at contacts 274 and 275 further points are opened in the pulsing circuits of the vertical magnet and the rotary magnet.

Should the wipers of the distributor advance to contacts corresponding to a busy finder, a circuit is completed from ground, contacts 255 of off-normal normal springs VON, break contacts 273, busy key, wiper 266, break contact 222, interrupter springs 263, winding of stepping magnet 262, to negative battery. The stepping magnet operates like a buzzer as long as ground potential is encountered on the guard lead. When the ground is not encountered, the wipers of the distributor come to rest in a position that pre-selects an idle finder for the next call that uses this allotter.

In order that two allotters that have selected one finder do not operate simultaneously a relay 215 has been provided in each allotter. Conductor 288 is connected to similar contacts which correspond to the same finder in other allotters. When relay 220 operates, wiper 269 is transferred at armature 226 from the winding of relay 215 to ground. Another allotter having selected the same finder remains unoperated, for the circuit to its start relay 210 is opened at armature 216 by its relay 215. The circuit to operate relay 215 extends from ground in the operated allotter, make contact 226, wiper 269, conductor 288, conductor 288 in the other allotter, wiper 269, break contact 226, winding of relay 215, to negative battery.

Although two allotters having selected the same finder advance their wipers simultaneously, they soon encounter different finders. The connections between the finders and the distributors are in an order that does not permit two distributors to select finders in the same sequence.

After the conversation and responsive to the calling subscriber replacing the receiver, ground is removed from the holding conductor C in the well known manner. Relay 290 releases and at contacts 297 completes the circuit to release magnet 278. The circuit may be traced from ground, break contacts 271, busy key, contacts 254, contacts 297, winding of release magnet, to negative battery. The release magnet operates and returns the wipers of the finder to their normal position. The vertical off-normal springs VON open the circuit of the release magnet and remove the ground from contact 289 to make the finder selectable.

When ground is removed from the holding conductor, cut-off relay 120 releases, and prepares the line circuits for the next call.

In case of trouble when the finder does not step or does not complete its switching operation, relay 250 operates to advance the wipers of the distributor. If the trouble is encountered before changeover relay 230 operates to open the circuit at contacts 234, relay 250 is energized through its lower winding. As the amplitude of vibration decreases, the weighted spring 244 closes the circuit for longer intervals to operate slow-operating relay 250 which at contacts 253 opens the pulsing circuit to the vertical magnet, at contacts 252 opens the initial operating circuit of relay 220, and at contacts 251 places ground on the guard lead 227 to energize the stepping magnet 262 and to deenergize relay 220. The ground extends to the guard lead through contacts 241, contacts 223, and contacts 251, to cause the distributor to step as previously described. If the trouble is encountered after changeover relay 230 and relay 260 operate, relay 250 is operated through its upper winding over an obvious circuit.

During the rotary searching of the finder, should the wipers 205 and 206 fail to encounter battery through the subscriber's cut-off relay, the shaft and wipers would be rotated to the eleventh rotary position. Upon reaching the eleventh position the cam springs 279 operate and place ground on the guard lead to advance the distributor wipers to the contacts of the next finder. Relay 270 releases to complete the circuit of the release magnet 278 which operates to return the switch to normal.

The vertical bank contact 137 of the tenth level is permanently grounded; therefore, if the vertical test wiper 106 has failed to find ground on the level in which the call originated, the wipers cut in on the tenth level, rotate to the eleventh position, and return to normal as described in the preceding paragraph.

The line circuits of Figure 3 may be substituted for the line circuits of Figure 1; lines 302 and 303 correspond to lines 102 and 103; control lead 305 is connected to contact 207; and start lead 315 corresponds to start lead 115.

Contacts 345, that correspond to contacts 145 of Figure 1, are controlled by relay 144; and contacts 312′ and 316′ are controlled by another line relay which is similar to relay 310. These line circuits are also arranged in groups, the circuits of each group being connected to two particular levels in the banks of each of the finders. The line relays in each group have contacts corresponding to contacts 312 and 316 connected in a chain circuit individual to the group. When subscriber 301 makes a call, a circuit is completed from ground, chain contacts 312′, contacts 345, lower winding of combined line and cut-off relay 310, contacts 321, line 302, subscriber's telephone 301, line 303, contacts 322, upper winding of relay 310, middle winding of relay 310 to negative battery. Relay 310 operates part way and closes contacts 311, 313, 314, and opens contacts 312. At contacts 311 a locking circuit is closed to maintain relay 310 energized after the operation of level start relay 144 opens the initial circuit; at contacts 312 a circuit is opened to prevent the operation of line relays that are in that part of the chain further from ground; at contacts 313 negative battery is extended from the middle winding of relay 310 to contact 207 to mark the position of the line in the bank; at contacts 314 ground is applied to a winding of level start relay 144 and to a winding of level marking cut-off relay 133. The finder system operates as previously described and switches the calling line to the first numerical switch.

When the switching relay 290 of Figure 2 returns ground to the CN lead of Figure 3, relay 310 operates fully by the circuit extending from ground on the CN lead, middle winding of relay 310 to negative battery. At contacts 322 and 321 the windings of relay 310 are disconnected from the negative and the positive lines; at contact 316 the chain circuit is prepared for relays further along in the chain; and at contacts 317 the energizing circuits of level start relay 144 and of level marking cut-off relay 133 are opened. As previously described break contacts on the level start relays prevent other lines in the group from placing ground on lead 315 until relay 133 releases.

After the conversation is completed and while relay 310 is releasing, both contacts 312 and 316 in the chain circuit are open for an instant. Resistor 318 is connected across contacts 312 to prevent the release of any succeeding line relay that may be operated.

Having fully described one embodiment of my invention it will be understood that various changes may be made therein without departing from the spirit of my invention as set forth in the appended claims.

What is claimed is:

1. In a telephone system, a plurality of finder switches, a plurality of lines accessible to said switches and having terminals appearing in different levels of bank contacts in said switches, a vertical bank of test contacts for each of said switches, each level of lines having a common marking circuit including the vertical bank contacts for that level, a vertical wiper for each finder having access to its vertical bank, means responsive to the initiation of a call over one of the lines of a level for connecting a marking potential to the test contact associated with that level and for causing the operation of one of said switches to test the contacts of its vertical bank in search of said potential, and a relay in the marking circuit operated instantly responsive to the finding of said marked contact for disconnecting said marking potential from said test contacts.

2. In a telephone system, a finder switch, a group of lines accessible thereto, said lines divided into subgroups, a vertical test wiper for the finder, a test contact for each sub-group of lines traversed by said wiper, a marking circuit for each sub-group, means controlled from a calling line in a sub-group for closing its marking circuit to mark the test contact of that subgroup and cause operation of the finder to move said wiper in search of such marking, and a relay controlled over the closed marking circuit when found for opening the marking circuits of more than one sub-group of lines to thereby prevent the marking of certain of said contacts.

3. In a telephone system, a finder switch, a plurality of lines having contacts arranged in levels accessible to said switch, a vertical test wiper for the switch operated during the vertical movement thereof to find the level in which a calling line is located, test contacts traversed by said wiper, one for each level, a marking circuit for each line for marking the test contact of the level in which that line is located, means for moving the wiper to find a marked contact, and a relay in series with and common to more than one of said marking circuits and operated whenever the wiper finds a marked contact of one of these circuits to open the marking circuits to which it is common.

4. In a telephone system, a plurality of finder switches, a plurality of lines accessible thereto and having contacts arranged in levels in the banks thereof, a line relay for each line operated responsive to the initiation of a call thereover, said lines divided into groups including the lines of more than one level, a start relay for each group operated in response to the operation of the line relay of any line in that group to start a finder switch to find the calling line, a chain circuit including contacts of the line relays of a group for insuring the operation of only one line relay at a time, and means controlled by the operation of said start relay for opening the circuits of all unoperated line relays of that group.

5. In a telephone system, a group of lines, a finder switch having access to said lines, a common marking contact for said group of lines in said finder switch, a marking circuit, a line relay for each line operative in response to a call from the associated line to extend a marking to said contact over said marking circuit, a start relay common to said lines, a circuit completed responsive to the operation of any one of said line relays for operating said start relay, a finder start circuit completed in response to said start relay operation for causing said finder to hunt for the group of lines, operate circuits for said line relays, contacts operated by said operated start relay for disconnecting said operate circuits to render the other line relays of the group temporarily inoperative, series relay means operated over said marking circuit in response to the finding of said contact by said switch for disconnecting said marking from said contact and for causing said switch to hunt for the particular calling line, and other relay means individual to the calling line operated when the line is found to cause release of said start relay, the start relay thereupon reconnecting said operate circuits to render the other line relays operative again to mark said common contact in response to other calls.

6. In a telephone system, a group of lines, a finder switch having access to said lines, a line relay for each line and contacts therefor, a start relay having an operate circuit, a marking cut-off relay having make contacts and break contacts; a marking circuit including contacts of any operated one of said line relays, said cut-off relay break contacts, and a marking contact in said switch for said group of lines; a locking circuit for said cut-off relay including said make contacts thereof and contacts of any operated line relay, one of said line relays operating in response to a call from its associated line, said line relay contacts operating in response to the operation of said line relay to operate said start relay over its said operate circuit, and to connect a potential to said marking contact over said marking circuit, operate circuits for said line relays, contacts opened by said operated start relay for disconnecting said operate circuits of said line relays to render the other line relays of the group temporarily inoperative, a finder start circuit also completed in response to the operation of said start relay to cause said switch to hunt for said potential, said marking cut-off relay operating in response to the finding of said potential to close its said make contacts for completing said locking circuit and to open its said break contacts for disconnecting said potential from said marking contact, relay means in said switch also operating in response to the finding of said potential for causing said switch to hunt for the particular calling line, other relay means individual to the calling line operated in response to the finding of said particular calling line for disconnecting and restoring said operated line relay, said line relay contacts opening in response to such restoration to release said start relay, and said opened contacts of said start relay reclosing said line relay operate circuits in response to such release to render said other line relays again operative.

7. In a telephone system, a plurality of finder switches each having bank contacts arranged in levels and having test contacts corresponding to said levels, a vertical wiper for each switch for traversing the test contacts thereof, groups of lines, each group connected to a corresponding level of said bank contacts in each switch, a start relay, a guard relay, a marking circuit for one of said groups of lines including a winding and contacts of said guard relay and also the test contact corresponding to the level of said one line group in each switch, relay means operated responsive to the initiation of a call over any one of the lines of said one group for applying a marking potential to said marking circuit, an operate circuit completed in response to the operation of said relay means for operating said start relay, a finder start circuit completed in response to the operation of said start relay for initiating the vertical movement of an idle one of said switches to cause the vertical wiper thereof to search for said potential, said guard relay operating over said marking circuit in response to the finding of said potential by said vertical wiper, and said guard relay contacts operated in response to said operation of said guard relay to disconnect its said winding and said marking potential from said marked test contact of all of said switches.

CHARLES F. FFOLLIOTT.

(References on following page)

REFERENCES CITED

The following references are of record in the file of this patent:

UNITED STATES PATENTS

| Number | Name | Date |
|---|---|---|
| 1,656,300 | Stehlik | Jan. 17, 1928 |
| 1,688,588 | Lomax et al. | Oct. 23, 1928 |
| 1,849,694 | Saunders | Mar. 15, 1932 |
| 1,914,540 | Taylor et al. | June 20, 1933 |
| 1,924,661 | Stehlik | Aug. 29, 1933 |
| 2,115,320 | Saunders | Apr. 26, 1938 |
| 2,133,415 | Baker et al. | Oct. 18, 1938 |
| 2,294,907 | Hovland | Sept. 8, 1942 |